(12) United States Patent
Chang et al.

(10) Patent No.: US 9,801,777 B2
(45) Date of Patent: Oct. 31, 2017

(54) WALKING AID DEVICE

(71) Applicants: Chia-Pao Chang, Douliu (TW); Ying-Hsiang Lin, Taichung (TW); Yu-Cheng Chang, Taichung (TW)

(72) Inventors: Chia-Pao Chang, Douliu (TW); Ying-Hsiang Lin, Taichung (TW); Yu-Cheng Chang, Taichung (TW)

( * ) Notice: Subject to any disclaimer, the term of this patent is extended or adjusted under 35 U.S.C. 154(b) by 0 days.

(21) Appl. No.: 15/272,753

(22) Filed: Sep. 22, 2016

(65) Prior Publication Data

US 2017/0087043 A1  Mar. 30, 2017

(30) Foreign Application Priority Data

Sep. 25, 2015 (TW) ............... 104131700 A (51) Int. Cl.
  *A61H 3/04* (2006.01)
  *B60B 33/00* (2006.01)
  *B60B 33/06* (2006.01)

(52) U.S. Cl.
  CPC .......... *A61H 3/04* (2013.01); *B60B 33/0063* (2013.01); *B60B 33/0081* (2013.01); *B60B 33/063* (2013.01); *A61H 2003/046* (2013.01); *A61H 2201/1635* (2013.01); *A61H 2201/1671* (2013.01); *B60B 33/0094* (2013.01); *B60B 2200/22* (2013.01); *B60B 2200/26* (2013.01)

(58) Field of Classification Search
  CPC . A61H 3/04; A61H 2003/046; B60B 33/0081
  See application file for complete search history.

(56) References Cited

U.S. PATENT DOCUMENTS

| 5,012,550 | A | * | 5/1991 | Schlosser | B60B 33/0078 16/35 R |
| 5,263,226 | A | * | 11/1993 | Roy | B60B 33/021 16/20 |
| 5,328,000 | A | * | 7/1994 | Rutter | B60B 33/0078 16/35 R |
| 5,774,936 | A | * | 7/1998 | Vetter | B60B 33/021 16/35 R |
| 6,068,273 | A | * | 5/2000 | Rao | A61H 3/04 280/33.994 |
| 6,219,881 | B1 | * | 4/2001 | Wen | B60B 33/0018 16/35 R |
| 6,439,250 | B1 | * | 8/2002 | Balan | A61H 3/008 135/66 |
| 6,494,469 | B1 | * | 12/2002 | Hara | A61H 3/04 135/67 |
| 6,532,624 | B1 | * | 3/2003 | Yang | B60B 33/0002 16/35 D |

(Continued)

FOREIGN PATENT DOCUMENTS

TW     I454256 B    10/2014

*Primary Examiner* — Erez Gurari
(74) *Attorney, Agent, or Firm* — C. G. Mersereau; Nikolai & Mersereau, P.A.

(57) ABSTRACT

A walking aid device includes a support body inclusive of a plurality of support elements extending toward the ground. Each support element is coupled to a caster and a brake unit. Each brake unit has a clutching surface. The clutching surface controllably clutches a wheel of the caster or the ground to thereby generate friction for stopping the walking aid device.

2 Claims, 10 Drawing Sheets

(56) References Cited

U.S. PATENT DOCUMENTS

| | | | | |
|---|---|---|---|---|
| 8,573,612 B1* | 11/2013 | Fulk | ............................ | A61H 3/04 135/67 |
| 8,720,914 B1* | 5/2014 | Heath | ........................ | A61H 3/04 135/67 |
| 9,393,173 B1* | 7/2016 | Meza | ..................... | A63B 21/055 |
| 9,554,962 B1* | 1/2017 | Smith | ........................ | A61H 3/04 |
| 9,566,207 B1* | 2/2017 | Ratliff | ........................ | A61H 3/04 |
| 9,649,243 B2* | 5/2017 | Johnson | ..................... | A61H 3/04 |
| 2004/0020008 A1* | 2/2004 | Harris | ................... | B60B 33/0007 16/35 R |
| 2004/0135326 A1* | 7/2004 | Palmers | ..................... | A61H 3/04 280/5.2 |
| 2006/0236501 A1* | 10/2006 | Chou | ........................... | B60B 7/02 16/35 R |
| 2007/0119661 A1* | 5/2007 | Chang | ...................... | A45C 5/145 188/1.12 |
| 2009/0276977 A1* | 11/2009 | Liao | ..................... | B60B 33/0018 16/35 R |
| 2010/0313924 A1* | 12/2010 | Cho | ........................... | A45B 1/02 135/66 |
| 2013/0161135 A1* | 6/2013 | Kim | ........................... | B60T 1/04 188/74 |
| 2015/0048582 A1* | 2/2015 | Liu | ..................... | B60B 33/0015 280/87.041 |
| 2016/0000636 A1* | 1/2016 | Jie | ........................... | A61H 3/04 280/47 |
| 2016/0288687 A1* | 10/2016 | Scherle | ................... | B66F 9/063 |

* cited by examiner

WALKING AID DEVICE

BACKGROUND OF THE INVENTION

1. Field of the Invention

The present invention relates to walking aid devices and, more particularly, to a walking aid device with a brake structure.

2. Description of the Prior Art

Persons with compromised mobility, such as the elderly and the injured, not only walk with the assistance of an aid device, but also use the aid device to assist them in stopping the walk instantly. A conventional walking aid device disclosed in Taiwan invention patent 1454256 has a frame which lends support to a user. Leg portions each formed from a sleeve are disposed at the bottom of the frame. Balls resiliently held in place by springs are disposed in the sleeve such that the sleeve abuts against the ground through the balls; hence, a walk taken by the user always begins with the least drag and thus is easy. To stop walking, the user lets his or her body weight be borne by the frame such that the sleeve moves downward to abut against the ground, thereby generating the friction required to stop the walk instantly.

The conventional walking aid device has a drawback in stopping a walk instantly. The instant stop will occur, only if the sleeve is pressed upon and moved. downward to abut against the ground. Before the sleeve is pressed upon, with each ball being in single-point contact with the ground, the frame has so little friction with the ground that it slides across the ground readily. Users of the conventional walking aid device are infirm people who may not be able to press and move the sleeve downward to the extent that the sleeve abuts against the ground. Incapable of stopping a walk instantly, the users are predisposed to accidents.

SUMMARY OF THE INVENTION

It is an objective of the present invention to provide a walking aid device whereby a user lets his or her body weight be borne by the walking aid device such that a hood thereof clutches wheels thereof or the ground to generate considerable friction therebetween with a large surface area of the hood, thereby stopping quickly the wheels from rotating.

In order to achieve the above and other objectives, the present invention provides a walking aid device, comprising:

a support body comprising a plurality of support elements extending toward a ground and each having a first hollow-core portion;

casters corresponding in quantity to the support elements, each said caster comprising a forked element and a wheel pivotally disposed at the forked element, with the forked element extending to form a first guide column, wherein the first guide column of each caster is disposed at the first hollow-core portion of a corresponding one of the support element, and through the first guide column, and each said first guide column has therein a second hollow-core portion; and brake units corresponding in quantity to the support elements, each said brake unit comprising a second guide column disposed at the second hollow-core portion of a corresponding one of the first guide columns such that the second guide column is coupled to a corresponding one of the support elements, wherein a spring is disposed between each said first guide column and a corresponding one of the second guide columns, and each said second guide column is protruded from the second hollow-core portion to form two hoods each having a first clutching surface for controllably clutching the wheel of the caster.

Each said brake unit further comprises two lateral plates which flank not only the support element but also the caster and each have a second clutching surface and a slot, and each caster has a shaft slidably disposed in the slots of the two lateral plates, with each said slot having therein a spring elastically abutting against the shaft to allow the second clutching surfaces of the two lateral plates to controllably clutch the ground, thereby effectuating an instant stop.

The present invention further provides a walking aid device, comprising:

a support body comprising a plurality of support elements extending toward a ground;

casters corresponding in quantity to the support elements, wherein the casters are coupled to the support elements, respectively; and brake units corresponding in quantity to the support elements, wherein the brake units are coupled to the support elements and correspond in position to the casters, respectively, each said brake unit comprising two hoods which flank not only the support element but also the caster, each said hood having a slot, wherein a shaft of each said caster is slidably disposed in the slots of the hoods, and a spring is disposed in each said slot to elastically abut against the shaft, wherein each said hood has a third clutching surface for controllably clutching the ground to thereby effectuate an instant stop.

DETAILED DESCRIPTION OF THE EMBODIMENT OF THE INVENTION

Figure 1:
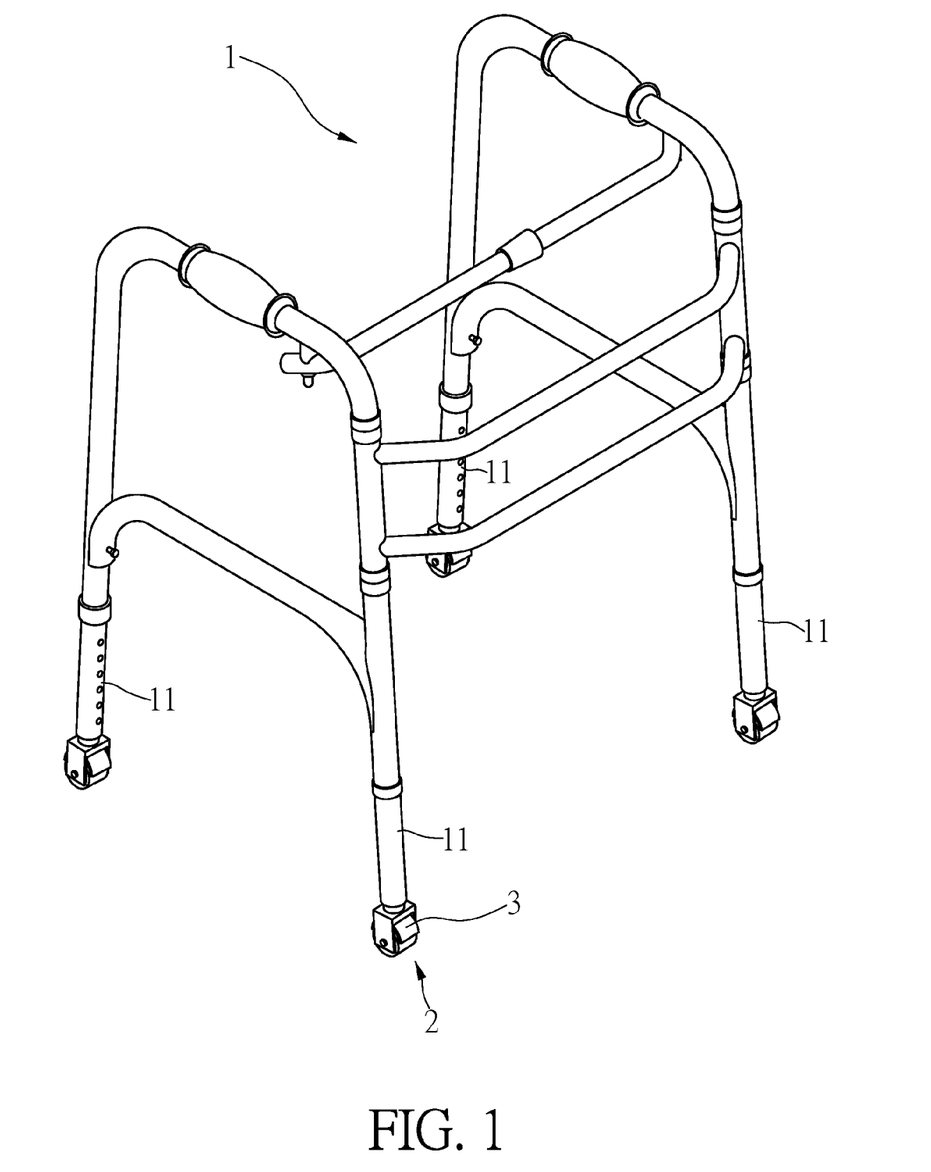
FIG. 1 is a perspective view of the first embodiment of the present invention.
Figure 2:
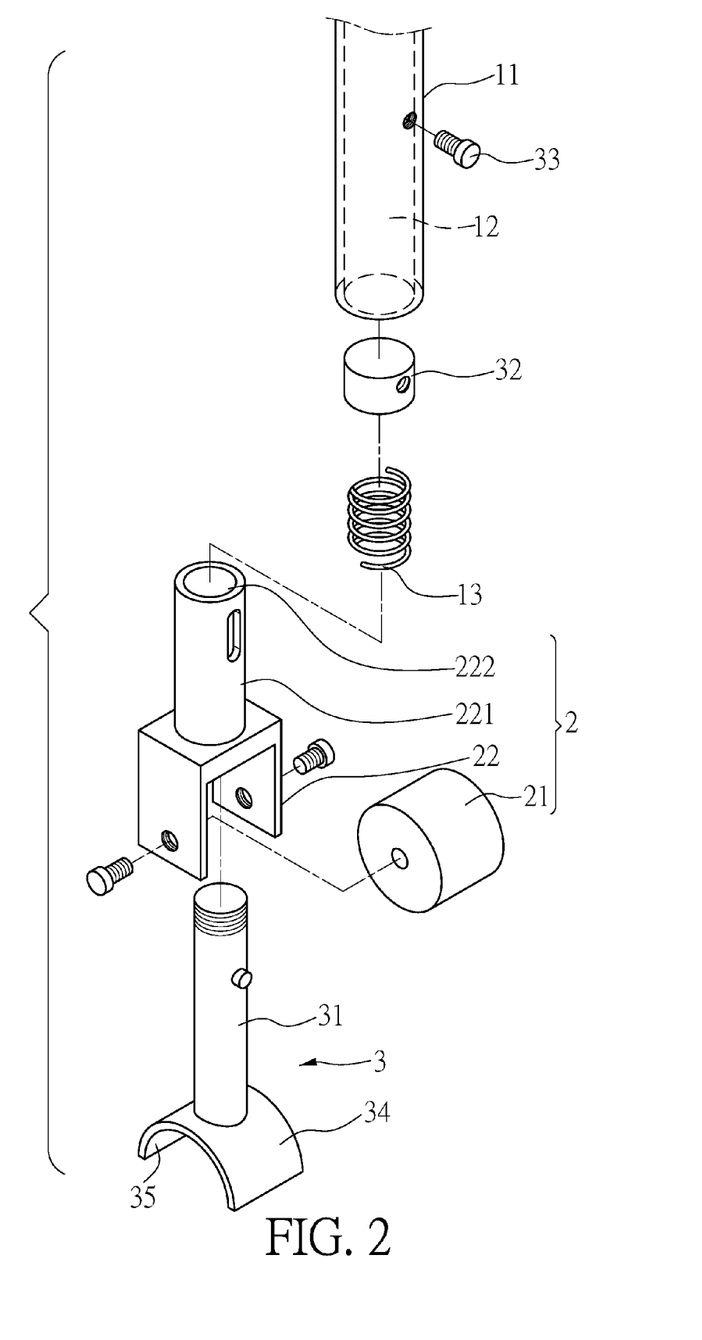
FIG. 2 is a partial exploded view of the first embodiment of the present invention.
Figure 3:
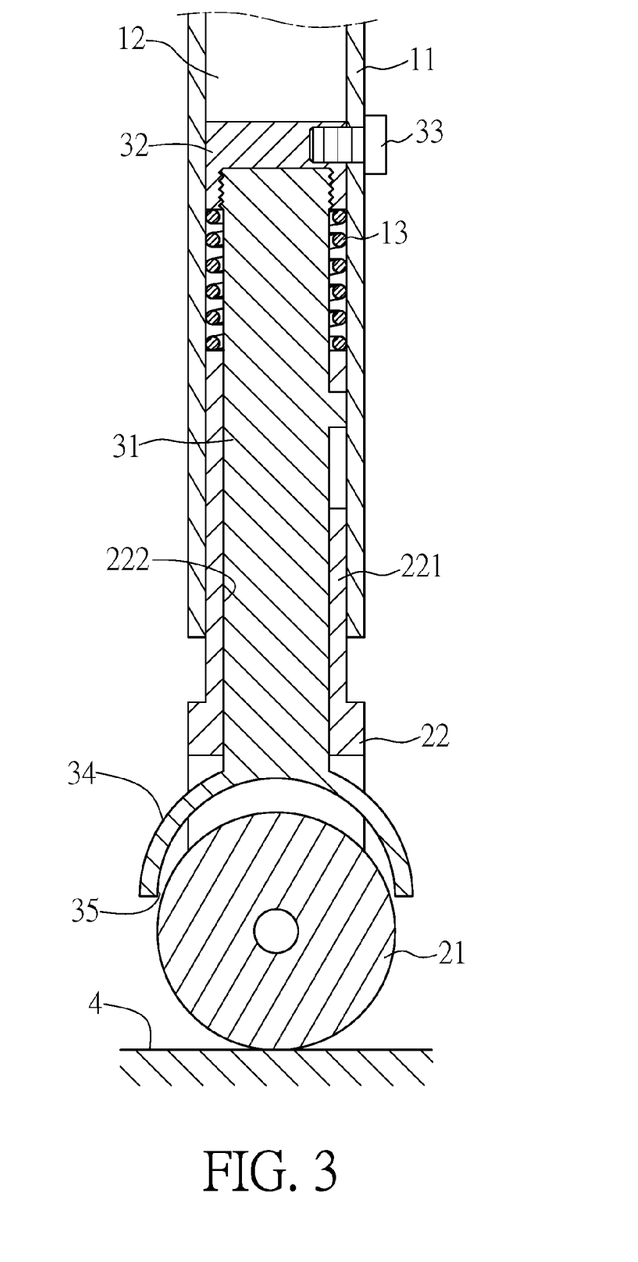
FIG. 3 is a partial cross-sectional view of the first embodiment of the present invention.

Referring to FIG. 1 through FIG. 3, in the first embodiment of the present invention, a walking aid device comprises a support body 1 which forms various support structures from, for example, plates or rods. The support body 1 comprises a plurality of support elements 11 extending toward the ground. In this embodiment, each support element 11 is pipelike, has therein a first hollow-core portion 12, and is coupled to a caster 2 and a brake unit 3.

The caster 2 comprises a wheel 21 and a forked element 22. The wheel 21 is pivotally disposed at the forked element 22. The forked element 22 extends to form a first guide column 221. The first guide column 221 has therein a second hollow-core portion 222. The first guide column 221 is slidably disposed at the first hollow-core portion 12 of a corresponding one of the support elements 11. The brake unit 3 comprises a second guide column 31. Through the second guide column 31, the brake unit 3 is slidably disposed at a second hollow-core portion 222 of the first guide column 221. One end of the second guide column 31 is protruded from the second hollow-core portion 222, inserted into the first hollow-core portion 12, and provided with a hat portion 32. The hat portion 32 is fastened to the support element 11 with a fixing screw 33 such that the brake unit 3 and the support element 11 are coupled together. The other end of the second guide column 31 is protruded from the second hollow-core portion 222 and extended toward the wheel 21 to form two hoods 34. A first clutching surface 35 is defined on the wheel-facing side of each hood 34. The first hollow-core portion 12 has therein a spring 13. The two ends of the spring 13 elastically abut against the hat portion 32 and the first guide column 221, respectively. Under the elastic force of the spring 13, the brake unit 3 is lifted, separating the hood 34 from the wheel 21 by an appropriate distance.

Figure 4:
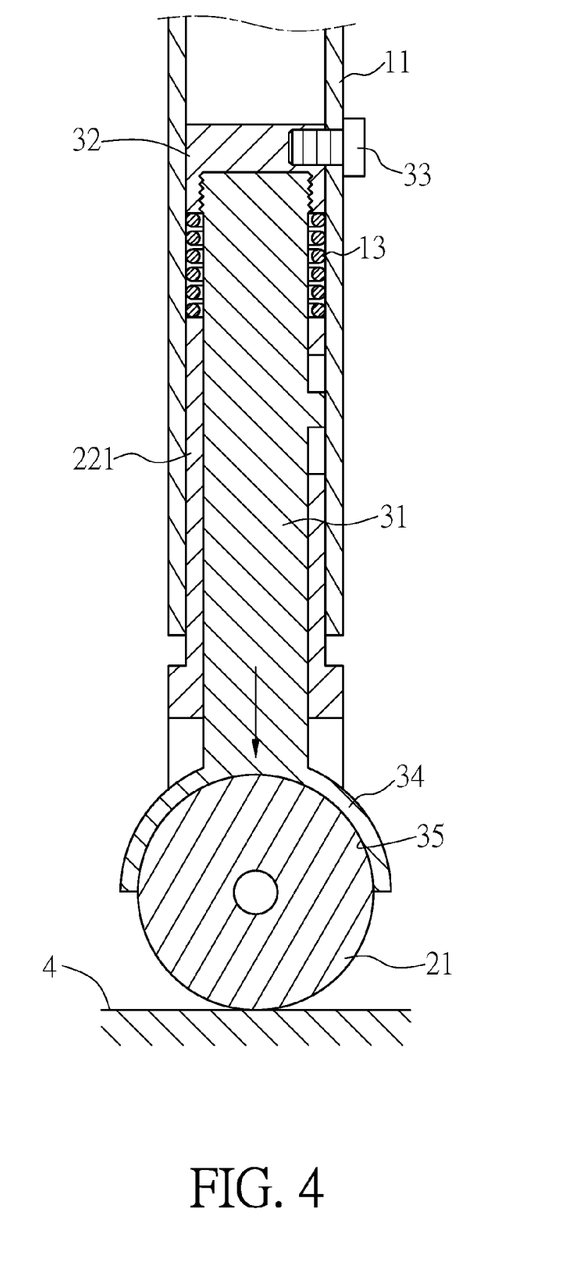
FIG. 4 is a schematic view of an operating state of the first embodiment of the present invention.

Given the aforesaid structures, a user not only has his or her body supported by the support body 1, but also walks with the assistance of the support body 1 while the wheel 21 is rolling across a ground 4. Referring to FIG. 4, to stop walking instantly, the user lets his or her body weight be borne by the support body 1 to therefore move the support body 1 and the support elements 11 downward, thereby moving the brake unit 3 downward, synchronously; meanwhile, the second guide column 31 at the second hollow-core portion 222 of the first guide column 221 moves downward and thus drives the hood 34 toward the wheel 21, thereby allowing the first clutching surfaces 35 of the hoods 34 to clutch the wheel 21. The resultant friction between the wheel 21 and the first clutching surfaces 35 stops instantly the wheel 21 from rotating.

To resume the rotation of the wheel 21, the user stops letting his or her body weight be borne by the support body 1 such that the spring 13 lifts the hat portion 32 of the brake unit 3 as shown in FIG. 3 to therefore move the second guide column 31 upward; meanwhile the first clutching surface 35 of the hood 34 separates from the wheel 21, thereby resuming the rotation of the wheel 21.

The second embodiment of the present invention has some technical features in common with the first embodiment of the present invention, that is, the support body comprises a plurality of support elements extending toward the ground, and each support element is coupled to a caster and a brake unit. The second embodiment of the present invention is distinguished from the first embodiment of the present invention, and its distinguishing technical features are described below.

Figure 5:
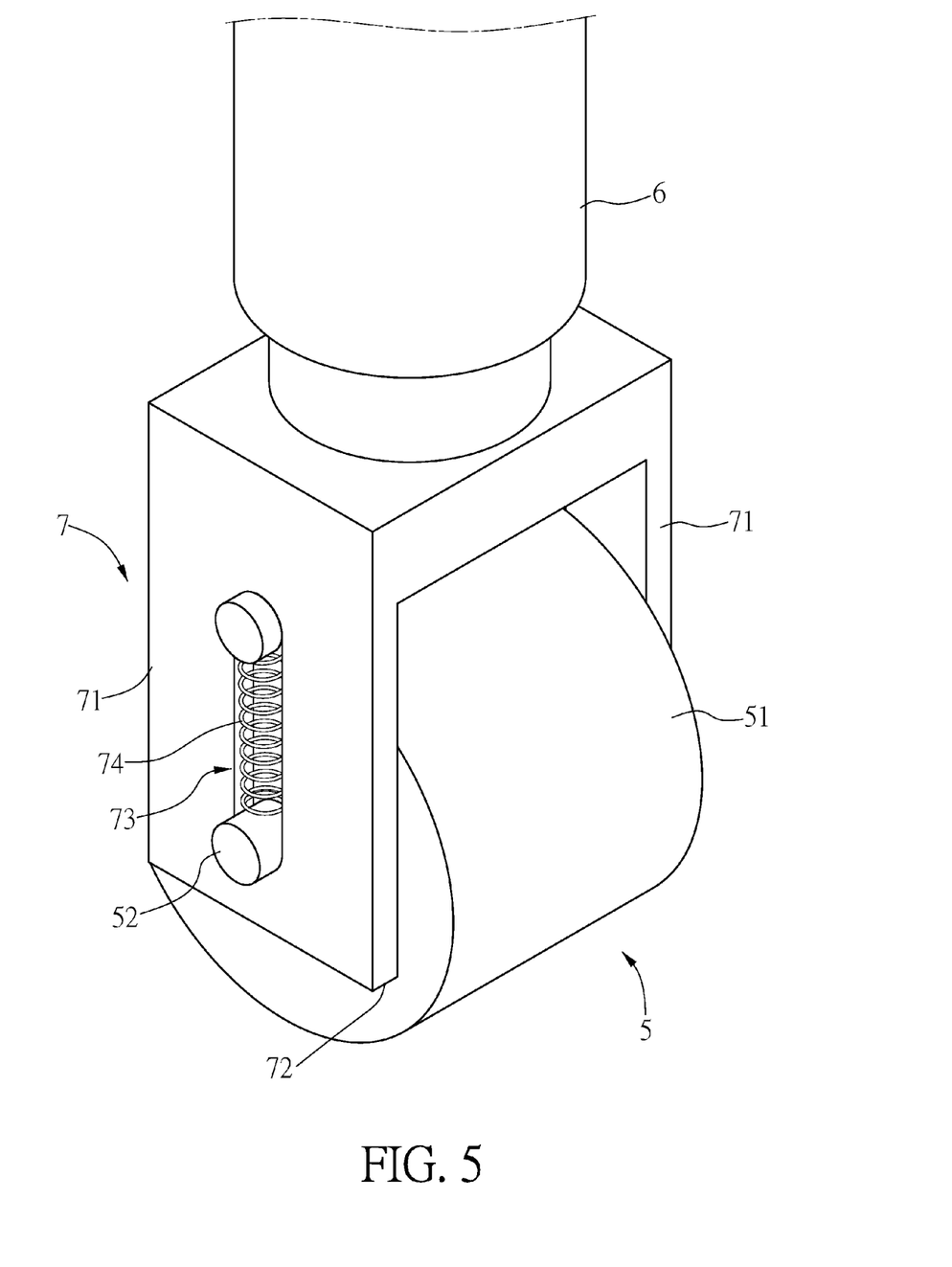
FIG. 5 is a partial perspective view of the second embodiment of the present invention.
Figure 6:
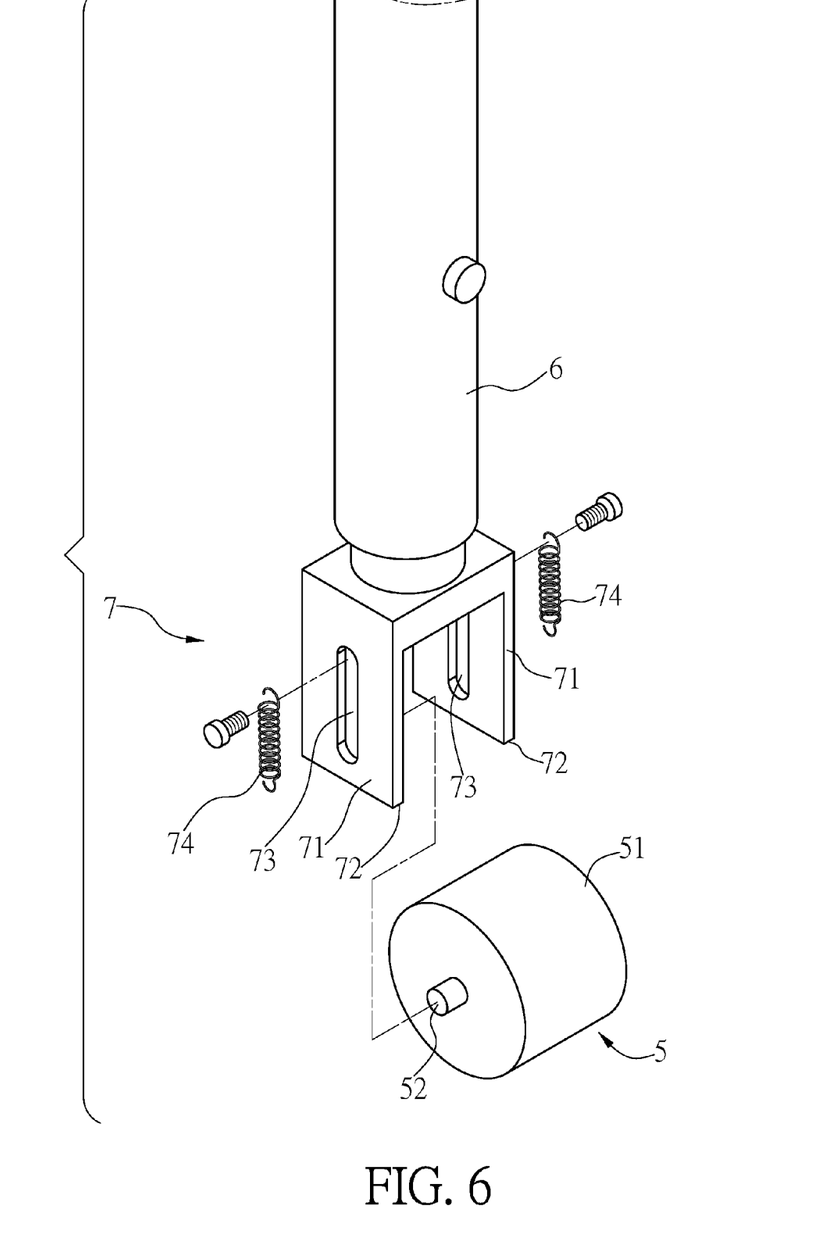
FIG. 6 is a partial exploded view of the second embodiment of the present invention.
Figure 7:
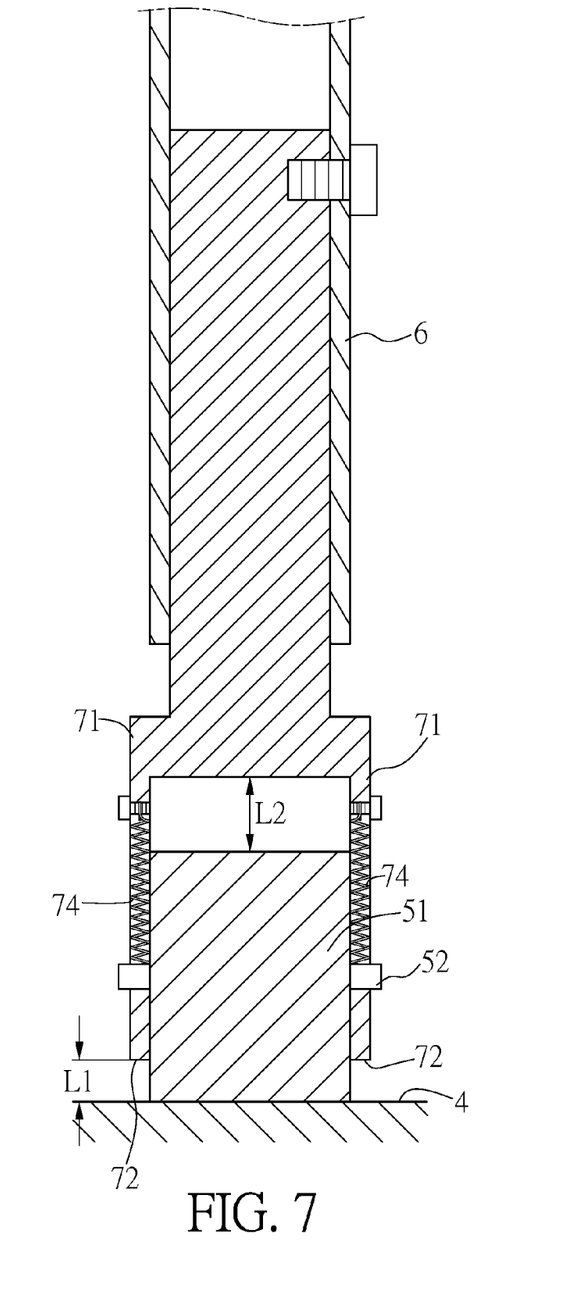
FIG. 7 is a partial cross-sectional view of the second embodiment of the present invention.

Referring to FIG. 5 through FIG. 7, the caster 5 comprises a wheel 51 and is disposed below the support element 6. The wheel 51 has a shaft 52 which protrudes laterally from the wheel 51 in two opposing directions. The brake unit 7 comprises two opposing hoods 71 which extend downward by a specific distance to thereby flank the wheel 51 laterally. A third clutching surface 72 is defined on the bottom side of each hood 71. Each hood 71 has a slot 73 which extends in the heightwise direction of the hood 71. The two ends of the shaft 52 of the wheel 51 are slidably and pivotally disposed in the slots 73 of the hoods 71, respectively. A spring 74 is disposed in each slot 73. The springs 74 elastically abut against the shaft 52. Under the elastic force of the springs 74, the hoods 71 and the support element 6 are lifted, separating the hoods 71 from the ground 4 by a distance. The distance L1 between each hood 71 and the ground 4 is less than the distance L2 between the support element 6 and the wheel 51. Hence, the user not only has his or her body supported by the support body, but also walks with the assistance of the support body while the wheel 51 in contact with the ground 4 is rolling across the ground 4.

Figure 8:
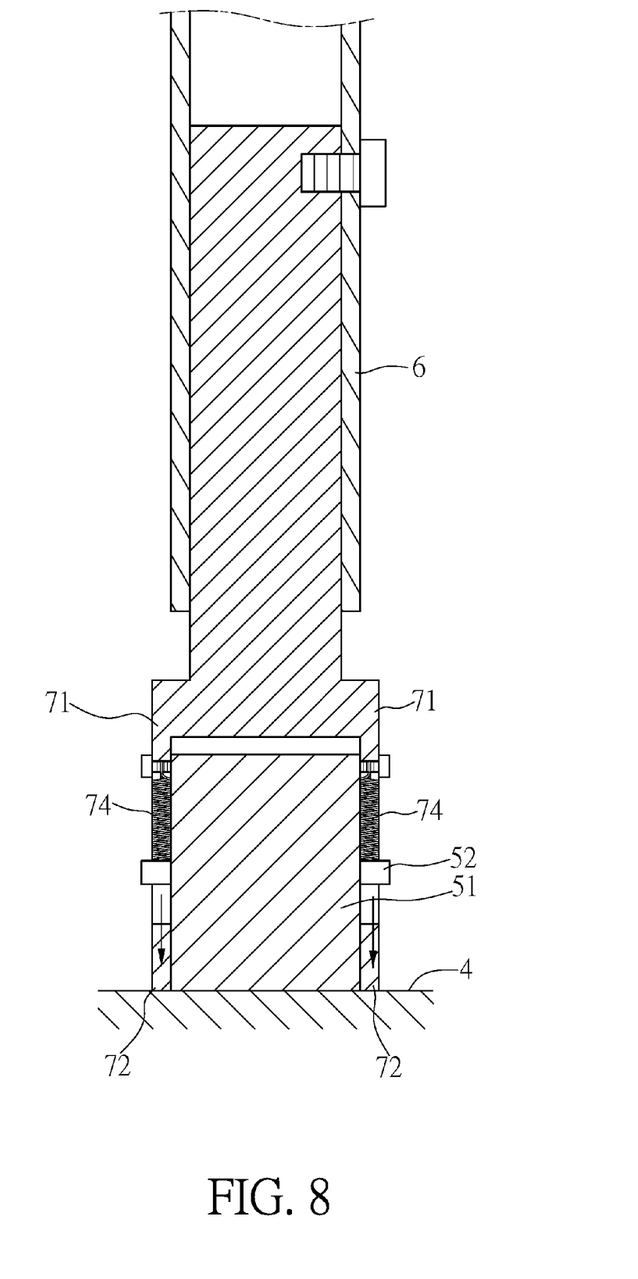
FIG. 8 is a schematic view of an operating state of the second embodiment of the present invention.

Referring to FIG. 8, to stop walking instantly, the user lets his or her body weight be borne by the support body to therefore move the support body and the support element 6 downward, thereby moving the hoods 71 downward, synchronously. Friction between the ground 4 and each hood 71 is generated to stop instantly the support body from moving, as soon as the third clutching surfaces 72 of the descending hoods 71 come into contact with the ground 4. To resume the rotation of the wheel 51, the user stops letting his or her body weight be borne by the support body such that the springs 74 lift the hoods 71 and the support element 6, thereby separating the third clutching surfaces 72 of the hoods 71 from the ground 4.

Figure 9:
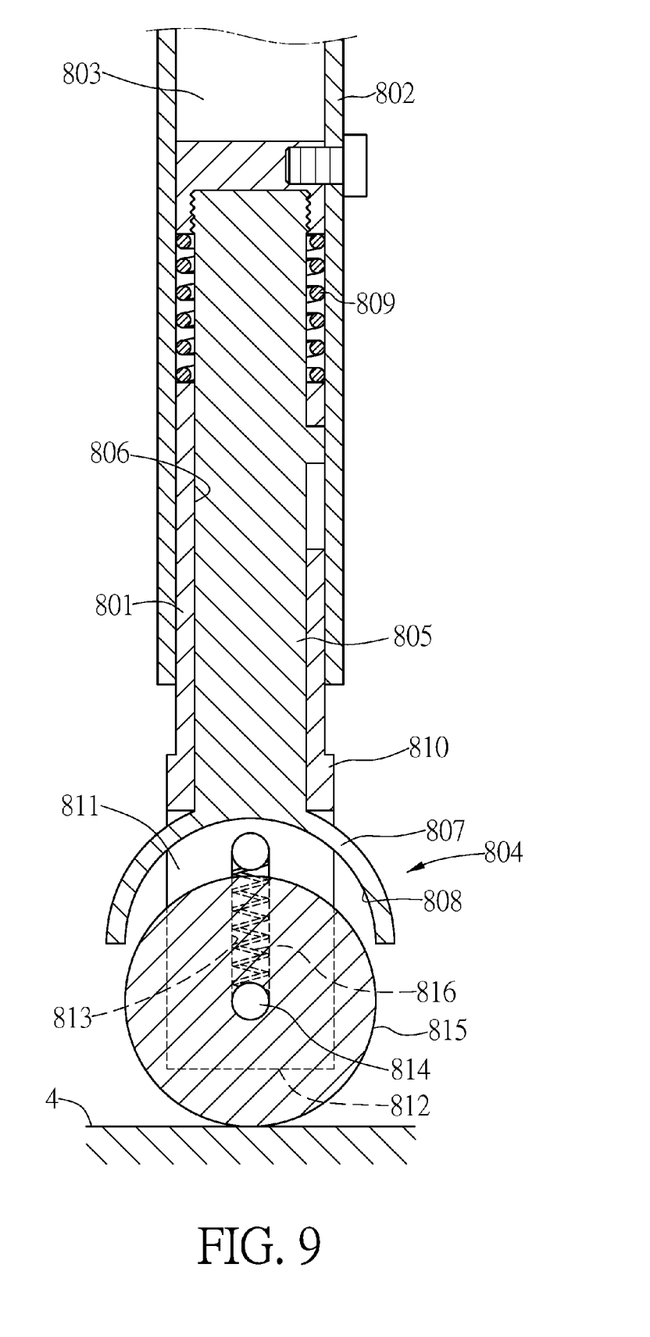
FIG. 9 is a partial cross-sectional view of the third embodiment of the present invention.

Referring to FIG. 9, there is shown a partial cross-sectional view of the third embodiment of the present invention. The third embodiment is a structural combination of the first embodiment and the second embodiment. In the third embodiment, a first guide column 801 of the caster is disposed at a first hollow-core portion 803 of the support element 802, whereas a second guide column 805 of the brake unit 804 is disposed at a second hollow-core portion 806 of the first guide column 801 and has a hood 807 protruding out of the second hollow-core portion 806. The hood 807 has a first clutching surface 808. A first spring 809 is disposed between the first guide column 801 and the second guide column 805. A forked element 810 of the caster is flanked by two lateral plates 811. A second clutching surface 812 is defined at the bottom of each lateral plate 811. Each lateral plate 811 has a slot 813 which extends in the heightwise direction of the lateral plate 811. A shaft 815 of a wheel 814 is pivotally disposed in the slots 813. Each slot 813 has therein a second spring 816 which elastically abuts against the shaft 815. Under the elastic force of the first spring 809, the hood 807 is lifted and thus moved away from the wheel 814. Under the elastic force of the second spring 816, the lateral plates 811 are lifted and thus moved away from the ground 4. Hence, the user not only has his or her body supported by the support body, but also walks with the assistance of the support body while the wheel 814 in contact with the ground 4 is rolling across the ground 4.

Figure 10:
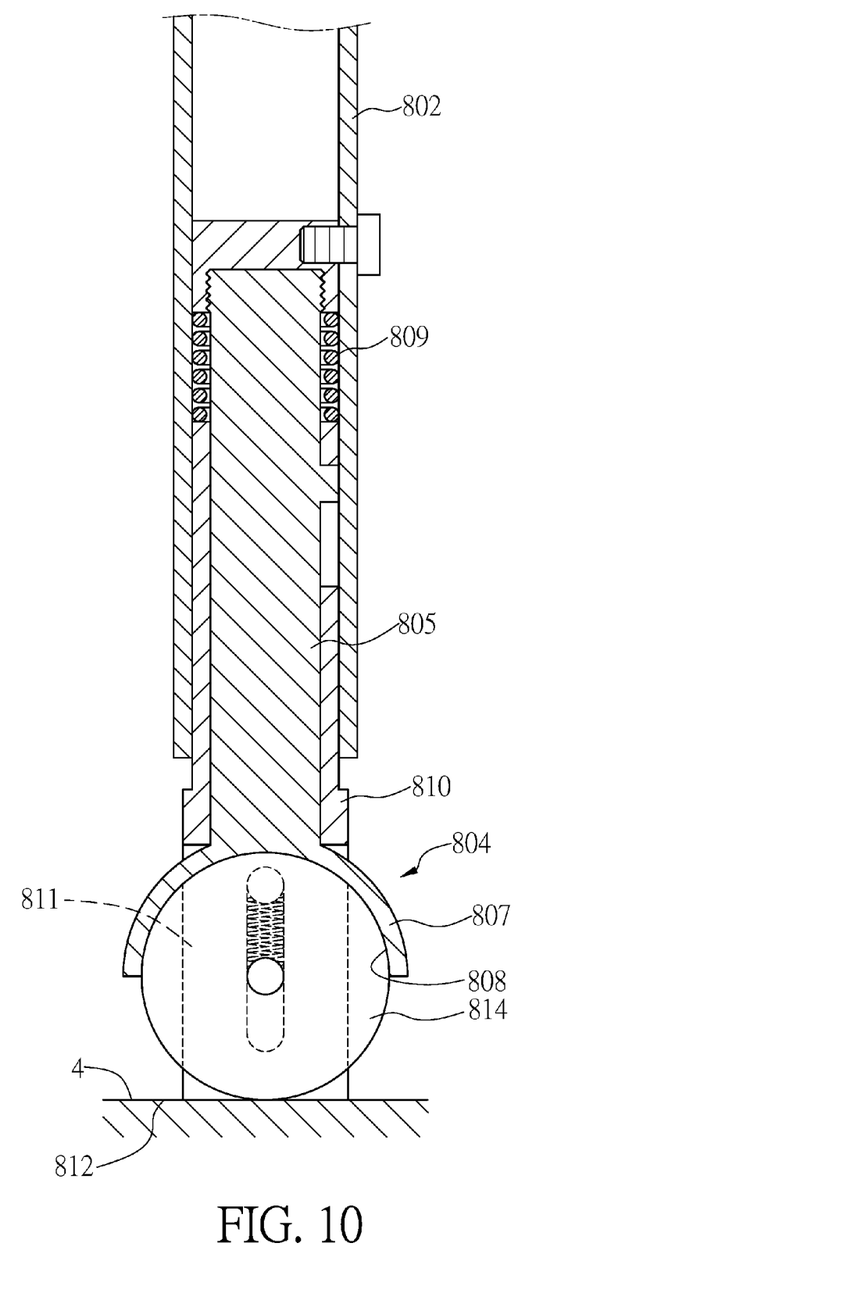
FIG. 10 is a schematic view of an operating state of the third embodiment of the present invention.

Referring to FIG. 10, to stop walking instantly, the user lets his or her body weight be borne by the support body to therefore move the support body and the support elements 802 downward, thereby moving the brake unit 804 and the forked element 810 downward, synchronously; meanwhile, the hood 807 moves downward to thereby enable the first clutching surface 808 to clutch the wheel 814, whereas the lateral plates 811 move downward to thereby enable the second clutching surfaces 812 to clutch the ground 4. Therefore, friction is generated between the first clutching surface 808 and the wheel 814 and between each second clutching surface 812 and the ground 4 to stop a walk instantly.

What is claimed is:
1. A walking aid device, comprising:
   a support body comprising a plurality of support elements extending toward a ground and each having a first hollow-core portion;

casters corresponding in quantity to the support elements, each said caster comprising a forked element and a wheel pivotally disposed at the fbrked element, with the forked element extending to form a first guide column, wherein the first guide column of each caster is disposed at the first hollow-core portion of a corresponding one of the support elements, and each said first guide column has therein a second hollow-core portion; and brake units corresponding in quantity to the support elements, each said brake unit comprising a second guide column disposed at the second hollow-core portion of a corresponding one of the first guide columns such that the second guide column is coupled to a corresponding one of the support elements, wherein a spring is disposed between each said first guide column and a corresponding one of the second guide columns, and each said second guide column is protruded from the second hollow-core portion to form two hoods each having a first clutching surface for controllably clutching the wheel of the caster.

2. The walking aid device of claim 1, wherein each said brake unit further comprises two lateral plates which flank not only the support element but also the caster and each have a second clutching surface and a slot, and each caster has a shaft slidably disposed in the slots of the two lateral plates, with each said slot having therein a spring elastically abutting against the shaft to allow the second clutching surfaces of the two lateral plates to controllably clutch the ground, thereby effectuating an instant stop.

* * * * *